Patented June 3, 1924.

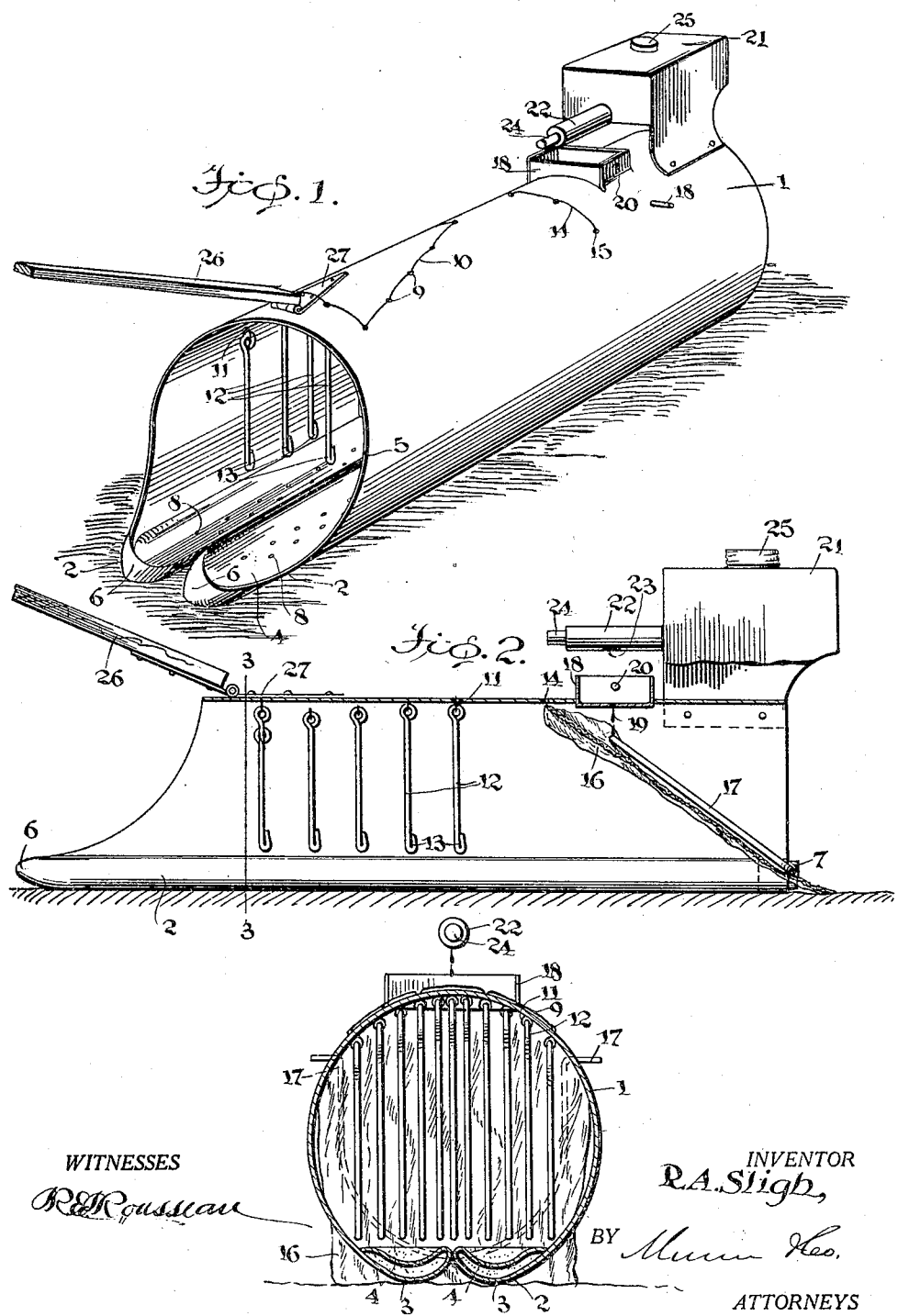

1,496,386

UNITED STATES PATENT OFFICE.

RUFUS A. SLIGH, OF COLUMBIA, SOUTH CAROLINA.

BOLL-WEEVIL TRAP.

Application filed March 1, 1923. Serial No. 622,138.

*To all whom it may concern:*

Be it known that I, RUFUS A. SLIGH, a citizen of the United States, and resident of Columbia, in the county of Richland and State of South Carolina, have invented certain new and useful Improvements in Boll-Weevil Traps, of which the following is a specification.

My invention relates to improvements in boll weevil traps and it consists in the combinations, constructions and arrangements herein described and claimed.

An object of the invention is to provide a device of the character described which is adapted to be drawn or propelled on the ground in engagement with growing plants and which embodies means for dislodging boll weevils, other insects and vermin from these plants, for imprisoning the dislodged insects and vermin, and for discharging a poisonous substance upon the dislodged insects and vermin and upon the plants engaged by the device.

A further object of the invention is to provide a device of the character described which is adapted for use in attaining the aforesaid objects without causing injury to the plants.

A still further object of the invention is to provide a device of the character described which is relatively simple in construction, economical to manufacture and easy to operate and thoroughly practical commercially.

Other objects and advantages will be apparent from the following description, considered in conjunction with the accompanying drawings, in which—

Figure 1 is a perspective view of a trap embodying the invention,

Figure 2 is a view mainly in longitudinal vertical section and partly in side elevation of the trap exhibited in Figure 1, portions thereof being broken away, and Figure 3 is a section along the line 3—3 of Figure 2.

The embodiment of the invention illustrated comprises a pair of longitudinal combined runners and receptacles, means resiliently spacing the receptacles apart and holding them substantially in parallel relation in respect to each other whereby the combined runners and receptacles may be moved in the direction of their length along opposite sides of plants in a row and the resilient spacing means will extend at the sides and above the plants, means being carried by the resilient means for cooperating with the latter to engage the branches of the plants so that weevils, other insects and vermin infesting the plants will be dislodged from the latter and will fall upon the receptacles, the upper sides of the receptacles being perforated to permit of the dislodged insects and vermin being sifted or falling through the perforations into the receptacles. The resilient spacing means also carries means for feeding a poisonous substance upon the plants and upon the dislodged insects and vermin.

In carrying out my invention, I make use of a single substantially rectangular sheet of material possessing inherent resiliency, such as a light gauge metal, and bend this sheet to form a casing or frame 1 which is substantially arcuate in cross sectional contour. Similar combined longitudinal tubular receptacles and runners 2—2 supporting and connected by the body or frame 1 are provided by bending the sheet backwardly along lines parallel and relatively adjacent to the side edges thereof until the lateral edges of the sheet lie in contact with the body of the latter. With this arrangement, the receptacles 2—2 are disposed inwardly of the side walls of the frame 1 and each receptacle includes a bottom wall 3 integral with one side of the frame 1 and having the lower face thereof convexly curved in cross sectional contour. Each receptacle also includes a top 4 consisting of the overlapping or backwardly bent edge portion of the sheet and being relatively depressed or downwardly curved along its longitudinal median line so that the upper face of the top 4 slopes inwardly and downwardly from the sides thereof toward the longitudinal median line thereof.

The body 1 is cut away at its front end so that the combined receptacles and runners extend beyond the plane of the upper side of the frame at the forward end of the latter and the front of the frame is inclined rearwardly toward its upper side, as indicated at 5 and as clearly shown in Figures 1 and 2.

The forward end portions of the combined receptacles and runners are bent rearwardly upon themselves as indicated at 6 to provide closures for the front ends of the receptacles and to fashion the combined receptacles and runners with rounded front end walls not likely to engage with slight obstructions on a surface to be traversed in such manner as to interfere with the progress of the combined receptacles and runners on the surface.

The receptacles 2 are closed at their rearward ends by removable plugs 7, and the synclinal portions of the upper wall of each of the combined receptacles and runners is formed with perforations 8 for a purpose to be hereinafter described.

A triangular series of spaced openings or perforations 9 are formed in the upper part of the frame 1 near the front end of the latter so that the base of the triangle defined by the openings is located proximate to the front end of the frame and extends transversely of the latter while the apex of the triangle is located in the longitudinal median line of the frame. An endless wire 10 is arranged with portions thereof depending through the perforations 9 in the form of loops or eyelets 11 from which depend freely swingable arms 12. With the arrangement described, certain of the swingable arms 12 are normally actuated by gravity to depend in a plane extending transversely of the frame 1, the end arms of the series being supported above the remote side of the combined runners and receptacles. The pendant arms 12 terminate at their lower ends close to the upper side of the receptacles 2—2 and preferably are weighted at their lower ends as by having the extreme lower end portions thereof bent upwardly, as indicated at 13. The remaining swinging arms 12 depend in vertical planes extending obliquely to the longitudinal median line of the frame 1 and converging toward the rearward end of the latter.

A second hanger wire 14 is arranged to extend across the upper side of the frame 1 in a plane rearwardly of the transverse median line of the frame and has portions depending through perforations 15 in the frame, the depending portions being secured to and supporting a flexible sheet or curtain of absorbent material 16 which is of a width sufficient to span the space between the opposite side walls of the frame and of such length as to extend slightly beyond the rearward end of the frame when inclined downwardly toward the rear end of the frame, as shown in Figure 2. A presser element 17 for engaging the rearward side of the sheet 16 has the form of a bail having outturned end portions at the free ends of its arms, such outturned end portions being journaled in horizontally aligned openings formed through the sides of the frame 1 near the upper ends of the latter, the remaining portions of the arms of the bail and the bend portion thereof resting upon the sheet 16 and being actuated by gravity to hold the latter in the position illustrated in Figure 2. The sheet 16 constitutes a wiper element which is normally maintained in a saturated condition, a liquid poisonous to insects and vermin being fed thereto continuously by means which will now be described. Such means include a fill cup 18 carried by the frame 1 or integral therewith in position to overlie the upper end portion of the wiper sheet 16, the fill cup 18 having a discharge orifice 19 in its bottom and overflow openings 20 in its sides. A storage container or reservoir 21 adapted to hold a supply of the poisonous liquid is carried by the frame 1 at the rearward end of the latter and is provided with a delivery tube 22 extending transversely of the fill cup 18 in overlying relation to the latter. The delivery tube 22 has an orifice 23 in its lower side located directly above the fill cup 18. A rod 24 slidably interfitting the delivery tube 22 provides a means for controlling the orifice 23 so that the rate of flow of the poisonous liquid from the container 21 to the fill cup 18 and thence to the wiper element 16 may be varied at will. A removable closure 25 for an opening in the upper part of the container 21 permits of the latter being refilled when required.

From the foregoing description of the various parts of the device, the operation thereof may be readily understood. A draft bar or handle 26 for the frame 1 is attached at one of its ends by a hinge 27 to the upper side of the frame 1 along the longitudinal median line of the latter and adjacent to the front end of the frame. The handle or draft bar preferably extends obliquely to the longitudinal median line of the frame so that a person walking alongside of a row of growing plants may draw the frame 1 in overlying relation to the plants of the row, the frame moving upon the combined receptacles and runners which respectively are positioned at opposite sides of the plant row and are moved in the direction of their length in parallel relation to the plant row.

The plants of the row will pass between the combined receptacles and runners, being guided into the space between the latter by the rounded slightly diverging forward end wall of the combined receptacles and runners. Since the combined receptacles and runners are flexibly spaced apart and connected by the resilient frame or casing 1, the distance between the adjacent sides of the combined receptacles and runners will vary with the diameters of the stems of the plants passing between the receptacles and runners.

As the frame 1 is drawn along a plant row, the plants will be engaged by the swinging arms 12 which will thus shake or agitate the branches and leaves of the plants so that boll weevils and other insects and vermin infesting such plants will be dislodged therefrom and will fall upon the upper side of the receptacles, being sifted through the perforations 8 into the interior of the receptacles. As the movement of the frame 1 is continued, the plants will be engaged by the wiper element 16 which carries a suitable poisonous liquid. Any insects or vermin clinging to the plants and not dislodged by the action of the arms 12 thereon will probably be dislodged from the plants by the wiper element 16. In addition, the engagement of the wiper element 16 with the plants will result in the deposit of poisonous liquid on the leaves and branches of the plant after the frame 1 has been moved out of engagement therewith.

The poisonous liquid fed to the wiper element 16 will drip therefrom upon the upper side of the combined receptacles and runners 2 and will pass through the perforations 8 of the latter into the receptacles, thereby effecting the death of the insects and vermin within the receptacles. The stoppers or closures 7 may be removed to permit removal of the insects and vermin from the receptacle. This may be expeditiously accomplished by tilting the frame 1 until the rearward end thereof is lowermost and then striking the side walls of the receptacles to dislodge the insects and vermin.

The device is simple in construction and while designed primarily for use in connection with the treatment of cotton plants to effect the destruction of boll weevils, is equally as well adapted for use in the treatment of plants of various descriptions growing in rows and infested by insects and vermin. The hanger wires 10 and 14 also serve to reinforce the walls of the frame 1.

Obviously, my invention is susceptible of embodiment in forms other than that illustrated in the accompanying drawings, and I therefore consider as my own all modifications and adaptations of the form of the device disclosed herein which fairly fall within the scope of the appended claims.

I claim:—

1. In a device of the character described, a pair of tube-like receptacles, each closed at its front end and having the upper walls thereof concavo-convex in cross sectional contour, the upper walls thereof being perforated, an arched frame connected with the remote sides of the receptacles and spanning the latter, and pendant means swingingly suspended from the frame in overhanging relation to the upper sides of the receptacles.

2. In a device of the character described, a pair of tube-like receptacles, each closed at its front end and having the upper walls thereof concavo-convex in cross sectional contour, the upper walls thereof being perforated, the front ends of said receptacles being rounded, and the bottom walls of the receptacles being convexly curved in cross sectional contour, an arched frame connected with the remote sides of the receptacles and spanning the latter, a hanger wire threaded through openings in the arched frame and reinforcing the latter, and pendant means swingingly suspended from the hanger wire in overhanging relation to the upper sides of the receptacles.

3. In a device of the character described, a pair of tube like receptacles, each closed at its front end and having openings through its upper wall, the upper wall of each receptacle being concavo-convex in cross sectional contour, an arched spring frame connected with the remote sides of the receptacles and spanning the latter swingingly supported arms pendant from the frame and overhanging the upper sides of the receptacles, and means carried by the frame for feeding a liquid upon the upper wall of the receptacles.

4. A device of the character described comprising a pair of tube-like combined runners and receptacles, an arched frame connected with the remote sides of the receptacles and spanning the latter in spaced overhanging relation to the upper walls of the receptacles, a flexible wiping curtain suspended at its upper end from the frame, said curtain engaging adjacent to its lower end with said receptacles, and being adapted to contact adjacent to its side edges with the inner wall of said arched frame, and a pivoted presser member supported from the frame and pressing said wiping curtain against said receptacles and the inner wall of the frame and against the plants between said combined receptacles and runners.

RUFUS A. SLIGH.